Patented Aug. 5, 1930

1,772,317

UNITED STATES PATENT OFFICE

GEORG KRÄNZLEIN, HEINRICH GREUNE, AND KARL ZAHN, OF HOCHST-ON-THE-MAIN, AND MAXIMILIAN PAUL SCHMIDT, OF BIEBRICH-ON-THE-RHINE, GERMANY, ASSIGNORS TO GENERAL ANILINE WORKS, INC., OF NEW YORK, N. Y., A CORPORATION OF DELAWARE

CARBAZOLE QUINONES AND PROCESS OF PREPARING THE SAME

No Drawing. Application filed January 18, 1927, Serial No. 161,951, and in Germany January 15, 1926.

Our present invention relates to a process of preparing carbazole quinones.

We have found that the para-thiazinequinones, for instance the [lin-(benzo-naphtho)-para-thiazine] -5.10-quinone of the formula:

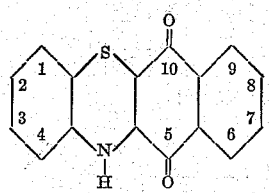

or the 1.2-benzo-[lin-(benzo-naphtho)-para-thiazine] -5.10-quinone can be transformed into the corresponding carbazole quinones by heating them with an agent capable of splitting off the sulfur, as for instance potassium ferricyanide, copper powder, potassium bichromate or the like. It is sometimes possible to split off the sulfur by simply heating the para-thiazinequinones in nitrobenzene, so that the nitrobenzene may also be regarded as an "agent capable of splitting off the sulfur."

By the above described process are obtained in almost quantitative yield the carbazole quinones which were partly not yet known. The carbazole quinones thus prepared are vat dyestuffs of great technical value.

The following examples serve to illustrate our invention but are not intended to limit it; the parts are by weight:

(1) 5 parts of [lin-(benzo-naphtho)-para-thiazine] -5.10-quinone (see "Annalen der Chemie" volume 427, page 288) are intimately mixed with 10 parts of copper powder and slowly heated in a current of carbon dioxide. The 2.3-benzocarbazole-1.4-quinone distils over as a reddish substance. It may be easily purified by re-crystallizing it from glacial acetic acid; it melts at 307° C. and is identical with the product stated by Knecht to be 3.2-benzocarbazole-1.4-quinone of the formula:

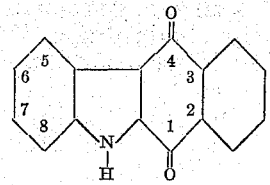

(see "Berichte" volume 12, page 343, and "Annalen" volume 202, page 111).

(2) 20 parts of 1.2-benzo- [lin-(benzo-naphtho)-para-thiazine] -5.10-quinone (see "Berichte" volume 57, page 509) are heated to boiling for five hours in 200 parts of naphthalene and 8 parts of copper powder. At about 100° C. the mass is diluted with toluene, filtered by suction at about 30–40° C. and washed with alcohol. The crude 2.3.5.6-dibenzo-carbazole-1.4-quinone is purified either by re-vatting it or by dissolving it in alcohol and some alkali and pouring this solution into diluted hydrochloric acid. The 2.3.5.6-dibenzo-carbazole-1.4-quinone of the formula:

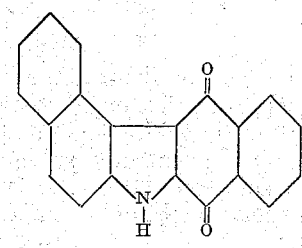

thus purified is a beautiful red product, which dissolves in concentrated sulfuric acid to a pure blue solution and forms a yellowish-red vat from which the vegetable and animal fibres are dyed beautiful orange-red tints.

(3) 90 parts of 1.2-benzo- [lin-(benzo-naphtho-)-para-thiazine] -5.10-quinone are heated to boiling in a reflux apparatus for 7 hours in 900 parts of nitrobenzene with 25 parts of finely powdered potassium ferricyanide. After cooling, the crude 2.3.5.6-dibenzocarbazole-1.4-quinone is filtered off by suction, washed with alcohol and purified in the manner indiacted in Example 2.

(4) 10 parts of [lin-(meta-tolu-naphtho)-para-thiazine] 5.10-quinone of the melting point 277-278° C. (obtainable by causing 2-meta-toluido-3-chloro-1.4-naphthoquinone to react with sodium sulfide and subsequently oxidizing the product thus obtained) are intimately mixed with 20 parts of copper powder and slowly heated in a current of carbon dioxide. The 2.3-benzo-7-methyl-carbazole-1.4-quinone of the formula:

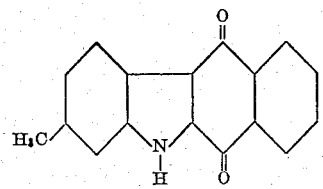

distils over as an orange-colored substance. It can be easily obtained in a pure form by recrystallizing it from an organic solvent. It is soluble in concentrated sulfuric acid to a violet-red solution and forms a yellow vat which dyes the fibre beautiful yellowish-orange.

(5) 10 parts of [lin-(para-methoxy-benzo-naphtho)-para-thiazine]-5.10-quinone of the melting point 269-270° C. (obtainable by causing sodium sulfide to act upon 2-para-anisidino-3-chloro-1.4-naphthoquinone and subsequently oxidizing the product thus obtained) are intimately mixed with 20 parts of copper powder and slowly heated in a current of carbon dioxide. The 2.3-benzo-6-methoxy-carbazole-1.4-quinone of the formula:

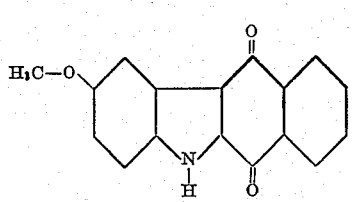

distils over as a reddish-orange substance. It can be easily purified by recrystallizing it from glacial acetic acid. The purified product dissolves in concentrated sulfuric acid to a violet-blue solution and forms a yellow vat which dyes the animal fibre beautiful orange.

We claim:

1. The process of preparing carbazole quinones by treating para-thiazinemonoquinones with an agent capable of splitting off sulfur.

2. The process of preparing carbazole quinones by treating para-thiazinemonoquinones with an agent capable of splitting off sulfur in the presence of a diluent.

3. The process of preparing carbazole quinones by treating para-thiazinequinones with potassium ferricyanide.

4. The process of preparing carbazole quinones by treating para-thiazinequinones with potassium ferricyanide in the presence of a diluent.

5. The process of preparing 2.3.5.6-dibenzocarbazole-1.4-quinone by treating 1.2-benzo [lin-(benzo-naphtho)-para-thiazine]-5.10-quinone with an agent capable of splitting off sulfur.

6. The process of preparing 2.3.5.6-dibenzocarbazole-1.4-quinone by treating 1.2-benzo [lin-(benzo-naphtho)-para-thiazine]-5.10-quinone with an agent capable of splitting off sulfur in the presence of a diluent.

7. The process of preparing 2.3.5.6-dibenzocarbazole-1.4-quinone by treating 1.2-benzo [lin-(benzo-naphtho)-para-thiazine]-5.10-quinone with potassium ferricyanide.

8. The process of preparing 2.3.5.6-dibenzocarbazole-1.4-quinone by treating 1.2-benzo [lin-(benzo-naphtho)-para-thiazine] 5.10-quinone with potassium ferricyanide in the presence of a diluent.

9. As a new product the 2.3.5.6-dibenzocarbazole-1.4-quinone, being a beautiful red substance, dissolving in concentrated sulfuric acid to a pure blue solution and forming a yellowish-red vat which dyes the vegetable and animal fibres beautiful orange-red.

10. Material dyed with a compound of the following formula:

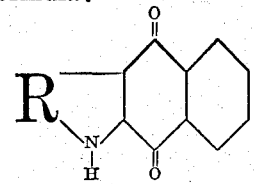

wherein R represents a divalent radical of an aromatic hydrocarbon of the group including benzene and naphthalene.

11. Material dyed with a compound of the following formula:

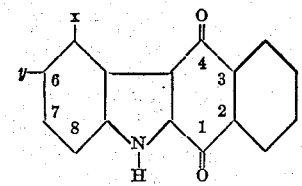

wherein $x$ and $y$ stand for hydrogen or $x$ and $y$ jointly stand for the group

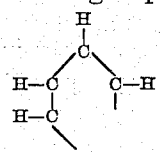

12. Material dyed with 2.3.5.6-dibenzocarbazole-1.4-quinone.

In testimony whereof, we affix our signatures.

GEORG KRÄNZLEIN.
HEINRICH GREUNE.
KARL ZAHN.
MAXIMILIAN PAUL SCHMIDT.